INVENTOR.
Ferdinand M. Bartelme.
BY Jesse R. Langley
ATTORNEY.

June 28, 1932. F. M. BARTELME 1,864,522
TRANSMISSION MECHANISM FOR MOTOR VEHICLES
Filed May 9, 1929 5 Sheets-Sheet 3

INVENTOR.
Ferdinand M. Bartelme.
BY Jesse P. Langley
ATTORNEY.

June 28, 1932. F. M. BARTELME 1,864,522
TRANSMISSION MECHANISM FOR MOTOR VEHICLES
Filed May 9, 1929 5 Sheets-Sheet 4

INVENTOR.
Ferdinand M. Bartelme.
BY Jesse P. Langley
ATTORNEY

Patented June 28, 1932

1,864,522

UNITED STATES PATENT OFFICE

FERDINAND M. BARTELME, OF GLENCOE, ILLINOIS

TRANSMISSION MECHANISM FOR MOTOR VEHICLES

Application filed May 9, 1929. Serial No. 361,604.

My invention relates to transmission mechanism for motor vehicles and particularly to such mechanisms as are automatically controlled by the speed of a moving part of the vehicle.

One object of my invention is to provide a transmission mechanism that is controlled automatically in accordance with the load requirements of the vehicle.

A further object of my invention is to provide a transmission mechanism that may operate automatically without shock or jar to change the speed ratio between the driving and the driven parts of a motor vehicle.

A further object of my invention is to provide a variable speed transmission that operates automatically to change its gear ratio under predetermined conditions that may be varied within limits at the will of the operator.

A further object of my invention is to provide a transmission mechanism in which the torque that is exerted to change the speed ratios between the driving and the driven parts under certain conditions varies in accordance with the speed of the vehicle.

A further object of my invention is to provide a transmission mechanism having a positive driving connection between the engine and the drive wheels of a motor vehicle when the transmission is in low gear and having a yielding driving connection when operating at other speed ratios.

A further object of my invention is to provide a transmission mechanism that may be combined with the fly wheel and engine clutch of a motor vehicle in such manner as to effect an important economy of parts while retaining the normal control of the connection of the engine to the driven parts of the vehicle.

A further object of my invention is to provide a transmission mechanism embodying a uni-directional driving mechanism that is positive in its action to constitute a driving connection between driving and driven parts and that is silent in its operation when the driven part overtravels the driving part.

A further object of my invention is to provide a transmission mechanism so constructed and arranged as to provide means for retarding the vehicle without the necessity for coasting against engine compression or for changing gears.

A still further object of my invention is to provide a combined transmission mechanism and gear pump brake in such manner that the latter may be effective in either direction of operation of the vehicle.

Transmission mechanisms that are at present most commonly employed in motor vehicles for the purpose of providing variable speed ratios between the engine and the drive wheels of the vehicle comprise a plurality of sets of gears, one member of each of which may be actuated into and out of mesh with the other gear wheel in accordance with the speed ratio that it is desired to obtain. The changing of gears by means of such mechanisms has always been somewhat unsatisfactory by reason of the necessity for securing substantially equal peripheral speeds of the gears to be placed in mesh.

Failure to approximately synchronize the change-speed gears of transmission mechanisms usually results in considerable impact between the teeth of the gears when they are brought into engagement with the resultant noise and with the possibility of damage to the gear teeth. Some skill and practice are necessary to change the speed ratios of present transmissions and it is also necessary for the driver of a motor vehicle to devote a certain portion of his attention to these changes regardless of traffic or other conditions that may require concentration on his part.

The unsatisfactory conditions referred to above are obviated in the mechanism of my invention. My improved transmission mechanism does not comprise change speed gears that must be engaged or disengaged while the vehicle is operating and the changes occur entirely automatically without any attention on the part of the driver.

The mechanism of my invention comprises, in general, a series of friction elements, the degree of engagement between which is controlled by a centrifugal device that rotates in accordance with the speed of the driven portion of the propeller shaft. In other words, the centrifugal controlling means operates in accordance with the speed of the vehicle to control the degree of engagement of the friction elements. Changes in speed ratio occur in accordance with the troque required to drive the vehicle as compared with that exerted by the centrifugally controlled friction elements.

The several friction elements are connected to the driven portion of the propeller shaft at different speed ratios by means of gears and one-way clutches. Accordingly, the friction elements tend to rotate at different relative speeds unless they are prevented from so doing by the centrifugal device.

Broadly speaking, the friction elements are controlled by the centrifugal device to vary the torque transmitted by them to drive the vehicle. Similarly, their relative speeds are varied when their frictional engagement is such as to cause the elements that rotate relatively slowly to attain the speed of the elements that rotate relatively fast, the speed of the engine being considered the same. Accordingly, the higher the speed of the vehicle, the greater is the tendency for each of the friction elements to attain the speed of the element having the next higher speed. Beyond a predetermined maximum speed, all of the elements will operate as a unit and the vehicle then operates in high gear, in which it is directly driven by the engine.

An important feature of the transmission of my invention is the variation at the will of the driver in predetermined speeds at which the friction elements effect a change in speed ratio. This variation is caused by a variation in the rate at which torque is developed and applied to the driven member. The greater the rapidity with which the torque exerted by the engine is applied to the driven member, the greater is the degree of frictional engagement between the elements that will be required to effect a given gear change to higher speed ratio, and consequently the car will attain a higher speed before the change is effected. When torque is applied gradually to accelerate the car, there is less tendency for the friction elements to slip and the same gear change will occur at a relatively lower vehicle speed.

In order to avoid the necessity for actuating gears into and out of mesh with coacting gears, I provide overrunning clutches in the low gear and second gear connections between the driving and the driven members. Since such parts rotate at relatively high speed, it is extremely essential that such clutches be not only positive when they constitute a driving connection, but that they be substantially entirely noiseless when their driven parts overrun the driving parts. The clutch mechanisms of the present invention are so constructed as to provide essential qualifications.

A further feature of the present invention is a gear pump brake that is integral with the transmission mechanism and is so controlled as to be effective both in the forward and in the reverse directions of operation of the vehicle.

The details of my invention will be described in connection with the accompanying drawings, in which.

Figure 1:
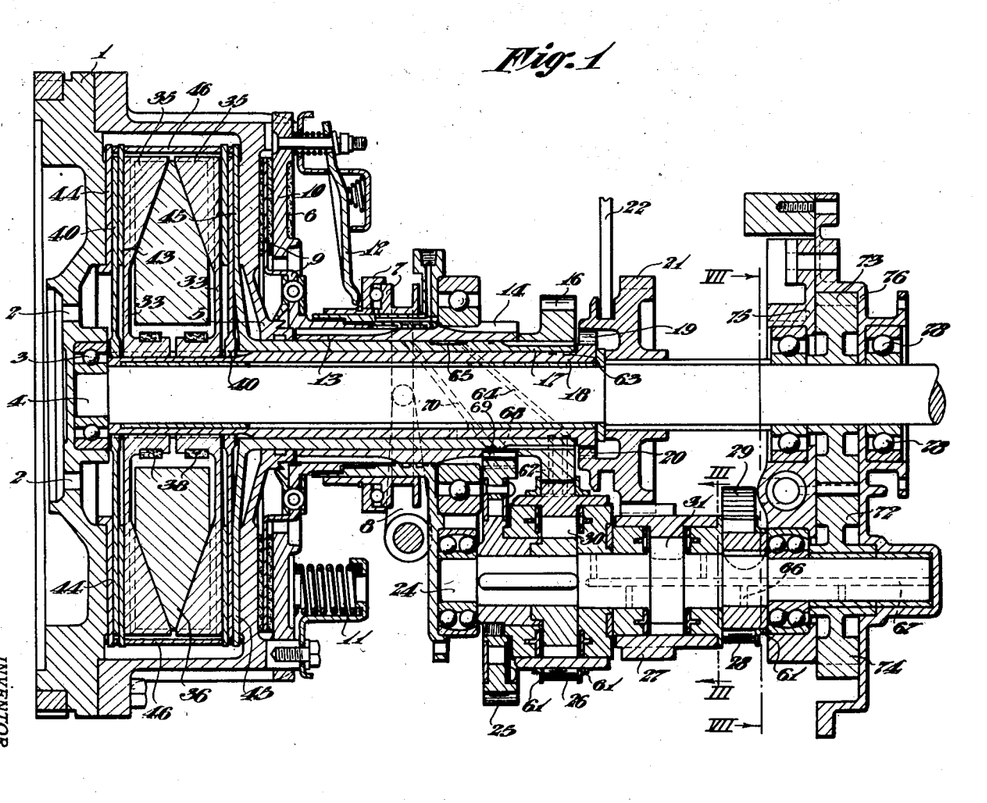
Figure 1 is a view in longitudinal cross-section of a transmission mechanism constructed in accordance with my invention, together with certain of its associated parts.
Figure 2:
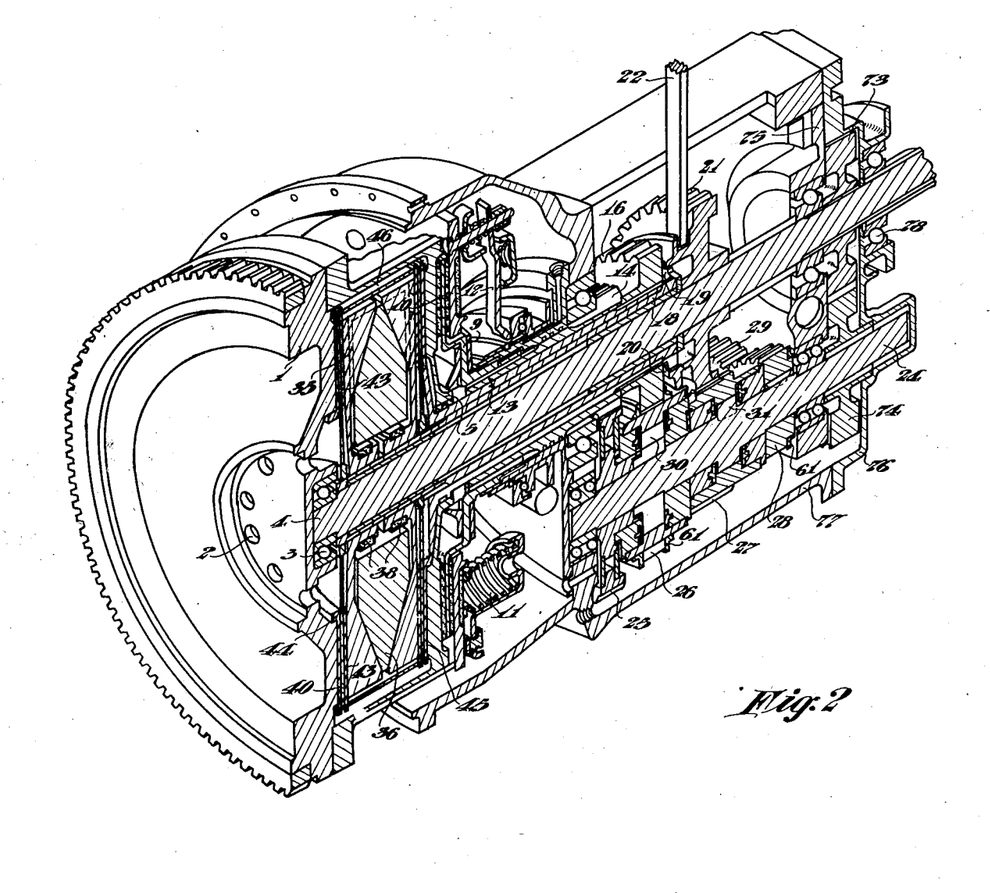
Fig. 2 is an isometric sectional view of the mechanism of Fig. 1.

Referring particularly to Figs. 1 and 2, the transmission mechanism of my invention comprises a fly wheel 1 of hollow construction and that is provided on its front or left face, as viewed in the drawings, with bolt holes 2, by means of which it may be secured to the usual engine shaft for rotation therewith. The fly wheel is rotatably mounted by means of a ball bearing 3 at the forward end of a propeller shaft 4, the other side of the fly wheel being provided with a flange 5 that is rotatably mounted upon a rotatable sleeve to be later described.

A clutch 6 of the single-disc multiple-finger type engages the rear face of the fly wheel 1. The clutch 6 is controlled by a slidable grooved sleeve 7 that is operated by a yoke 8, the latter being connected to the usual clutch pedal, not shown. A clutch disc 9 is normally pressed against the rear face of the fly wheel 1 by means of an annular plate 10 and a series of coil springs 11. The plate 10 is controlled by a series of fingers 12 adapted to be engaged by the slidable sleeve 7. The clutch disc 9 is keyed to a sleeve 13 that is provided at its right-hand end with a gear 14.

Adjacent the end of the gear 14 is a gear 16 that is keyed to a sleeve 17, the latter being rotatably mounted upon an inner sleeve 18 that is rotatably mounted on the propeller shaft 4.

The right-hand end of the sleeve 18 is provided with a gear 19 that meshes with an internal gear 20, the latter being integral with a larger gear 21 that is slidingly keyed to the propeller shaft and which may be moved to engage or disengage the gears 19 and 20. The position of the gear 21 along the propeller shaft 4 is controlled by a hand lever 22, the outer end of which may be located at any suitable point that is convenient to the operator of the vehicle.

A countershaft or jack-shaft 24 is provided with a relatively large gear 25 that is in constant mesh with the gear 14 and has a smaller gear 26 that meshes with the gear 16. A third gear 27 that is smaller than the gear 26 meshes with the gear 21. The countershaft 24 is also provided with a fourth and still smaller gear 28 that meshes with an idler gear 29 which is adapted to mesh with the gear 21 when the latter is in its extreme right-hand position.

The gears 25 and 28 are directly secured to the shaft 24 for rotation therewith, but the gears 26 and 27 are adapted to be connected to the shaft 24 by means of similar one-way or overrunning clutches 30 and 31, the details of which will be later described.

Figure 5:
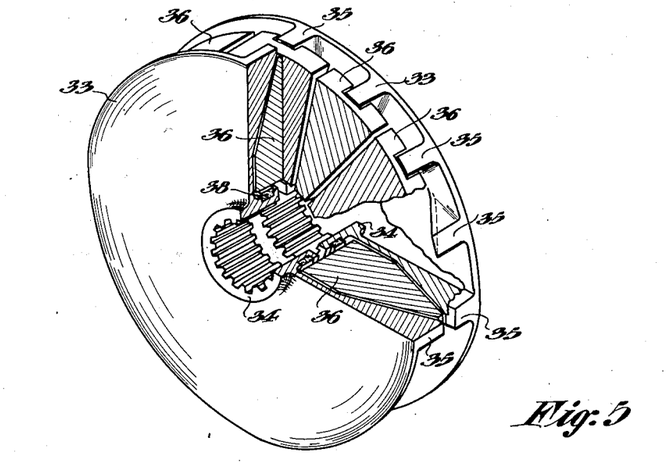
Fig. 5 is a perspective view of the centrifugal device and a portion of the associated apparatus, parts being broken away.
Figure 6:
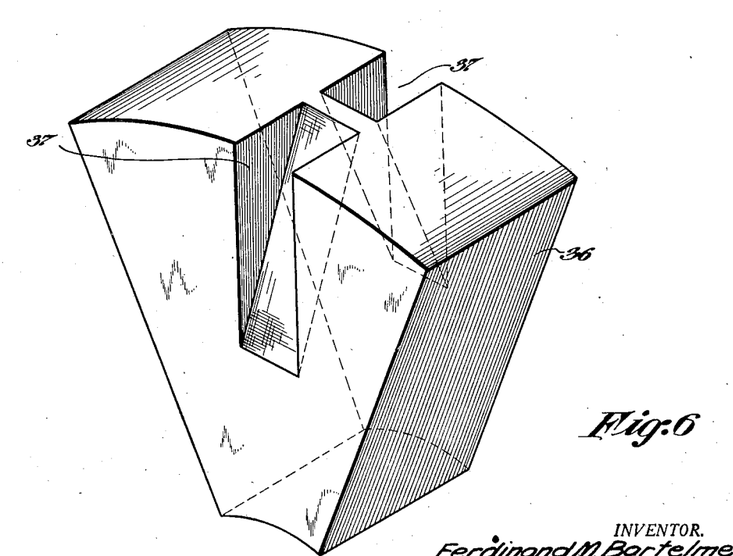
Fig. 6 is an enlarged perspective view of one of the weights of the centrifugal device of Fig. 5.

Reference may now be had also to Figs. 5 and 6 in which certain of the parts of the mechanism for automatically controlling the ratios of the transmission mechanism are shown in enlarged detail. The fly wheel 1, which is hollow, is provided with a series of annular discs or plates that constitute friction elements which cooperate with the inner sides of the fly wheel and with each other to effect different combinations of the elements of the transmission mechanism whereby different speed ratios obtain between the engine and the propeller shaft 4, which is connected to the usual driving wheels.

A pair of annular discs or plates 33 are provided with hubs 34 that are keyed to the sleeve 18. Each of the plates 33 is provided upon its inner face with a series of substantially triangular projections 35, the base portions of which are slightly spaced from each other. Between the plates 33 are a series of centrifugal weights 36, one of which is shown in enlarged detail in Fig. 6.

It will be noted that each of the weights 36 has a recess 37 of substantially triangular shape that corresponds closely in size and shape to the projections 35, and which the recesses 37 are adapted to receive. The weights 36 are loosely mounted in the space between the plates 33, the relative angular spacing of the weights being maintained by the projections 35, the latter however permitting relative movement of the weights radially with respect to the plates 33. Suitable buffers 38 for the weights 36 are provided on the hubs 34.

Two annular plates 40 are keyed to the sleeve 18 for rotation with the plates 33. The plates 40 are spaced from the plates 33 by plates 43 that are connected at their outer edges to a plate 44 that is between the forward side of the fly wheel 1 and one of the plates 40, and to a second plate 45 that is adjacent to the inner face of the rear side of the fly wheel and in engagement with the corresponding plate 40. The plate 45 is integral with the sleeve 17. A drum 46 connects the outer edges of the plates 43, 44 and 45.

The discs or plates may be of any desired materials possessing the requisite coefficients of friction and wear-resisting qualities. I have found that the plates may be of steel which may be heat-treated, although such treatment is not necessary. The plates may also be of cast iron or of bronze or steel alloys. Preferably, I employ plates of different materials, a suitable combination being plates 33 of cast iron, plates 43, 44 and 45 of bronze, and the fly wheel being of cast iron as in usual practice. This arrangement provides that a bronze plate is between each pair of surfaces of cast iron members.

The several plates 33, 40, 43, 44 and 45 and the inner faces of the sides of the fly wheel 1 are normally separated and disengaged, whereby relative movement may freely occur. In other words, there is normally substantially no frictional engagement between the sides of the various discs and particularly by reason of the fact that the interior of the drum 46 is provided with a quantity of oil for lubricating the coacting surfaces of the plates and weights. Such lubrication insures smooth action between the coacting friction surfaces of the several elements.

Figure 3:
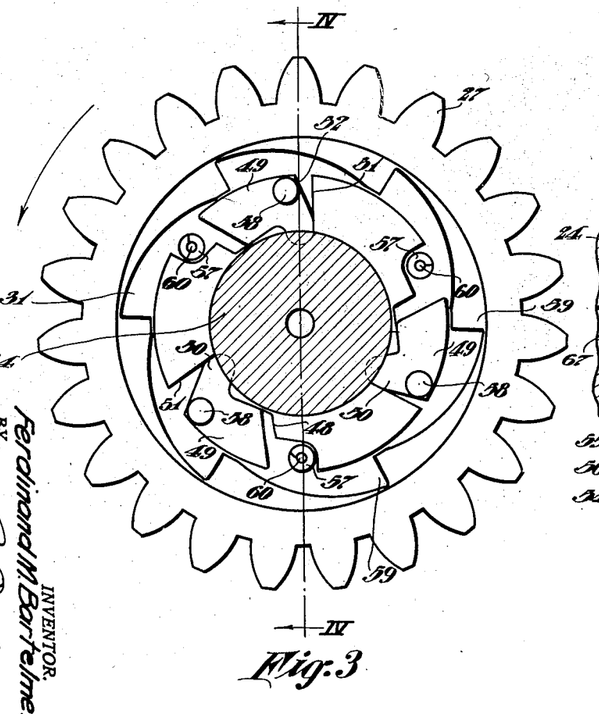
Fig. 3 is a sectional view taken on line III—III of Fig. 1 of an overrunning clutch.
Figure 4:
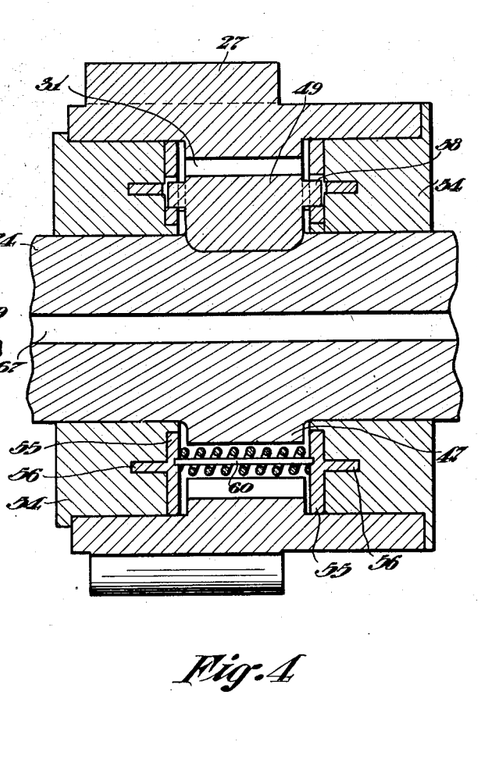
Fig. 4 is a longitudinal sectional view of the clutch on line IV—IV of Fig. 3.

Reference may now be had to Figs. 3 and 4 in which are shown the details of one of the two similar clutch mechanisms, for example, the clutch 31. The countershaft 24 is provided with an enlarged portion 47 having an irregular peripheral contour comprising recesses 48 in which are mounted dogs 49 having lever arms 50, the curved ends of which extend into similarly shaped portions of the recesses 48 and are adapted for rotative movement therein. The enlarged portion 47 is also provided with substantially radial shoulders 51 that are adapted to engage a corresponding shoulder 52 of the dogs 49 when the latter are in their outer or operative position.

At each side of the enlarged portion 47 is an annular bushing 54 that is rotatably mounted on the shaft 24 and is secured to the gear 27 for rotation therewith. On the inner face of each of the bushings 54 is an annular plate 55 having flanges 56 that project into the bushings 54. The plates 55 are loosely mounted in an annular groove in the respective bushings 54 for frictional engagement with the latter, such engagement being accentuated by the provision of the flanges 56 and further by the provision of springs 57 which tend to press the plates outwardly against the bushings. Each of the dogs 49 is provided with two projecting pivot pins 58 which extend into openings in the plates 55.

The operation of the clutch occurs when the shaft 24 rotates in a counter-clockwise direction, as viewed in Fig. 3, at a rate faster than the gear 27 tends to rotate. Under these circumstances the plates 55, by reason of their frictional engagement with the bushings 54, tend to retard the rotation of the dogs 49 and the latter are rotated in a clockwise direction in the recesses 48, as viewed in Fig. 3, by means of their pivot pins 58. The result is that the outer ends of the dogs 49 are projected outwardly in position to engage the coacting clutch teeth 59 with which the interior of the gear wheel 27 is provided. This engagement continues so long as the shaft 24 and the clutch 31 drive the gear 27.

If, however, the gear 27 is rotated at a higher speed than the shaft 24 and the clutch 31, the bushings 54, which rotate with the gear 27, tend to carry the plates 55 and pivot pins 58 ahead of the clutch 31 with the result that the dogs are rotated in the recesses 48 to the positions in which they are illustrated in Fig. 3, out of engagement with the internal clutch teeth 59 of the gear 27. The dogs 49 are forcibly held in their innermost or retracted positions by reason of the frictional engagement of the plates 55 and the bushings 54 so long as the gear 27 overruns the clutch 31 and the shaft 24. The springs 57 are retained in position by pins 60 therethrough, the ends of which extend into recesses in the friction plates 55.

It will be appreciated therefore that the clutch 31 is entirely noiseless in its operation, since the frictional engagement of the parts hereinabove referred to is amply sufficient to overcome any centrifugal force tending to throw the dogs 49 outwardly. The structure of the clutch is such, however, that it may drive the gear 27 with a positive driving connection and that it can transmit a force that is many times that required in practice.

The operation of the transmission mechanism will now be described. It may be assumed that the engine and the fly wheel 1 connected thereto are rotating with the clutch 6 in engagement with the fly wheel, but with the gear 21 in such position that the gears 19 and 20 are disengaged. It may be assumed further that the vehicle is stationary. To operate the vehicle, the clutch 6 is disengaged from the fly wheel 1 and the lever 22 is operated to slide the gear 21 forward to mesh the internal gear 20 with the gear 19.

To start the vehicle, the clutch 6 is released to permit the springs 11 and the plate 10 to press the clutch disc 9 against the rear face of the fly wheel and the driving connections are then established as follows. The engine-driven fly wheel 1 drives the vehicle through the clutch 6, sleeve 13, gears 14 and 25, counter shaft 24, clutch 31, gears 27 and 21, and propeller shaft 4, which is secured to the driving wheels of the vehicle in any usual manner as, for example, through a differential gear mechanism.

The vehicle now operates in first speed or low gear, the engine having positive driving connection to the driving wheels. During the operation of the vehicle in low gear, the plates or discs within the fly wheel are positively driven at different speeds relatively to each other and to the fly wheel 1. The plates 43, 44 and 45, which are mechanically connected, are driven from the countershaft 24 by means of clutch 30, gears 26 and 16, and sleeve 17.

Similarly, the plates 33 and 40, which are also mechanically connected, are driven from the countershaft 24 by means of the clutch 31, gears 27 and 21, gears 20 and 19, and sleeve 18, to which the plates 33 are directly connected.

Under the foregoing conditions of operation it will be appreciated that the fly wheel operates at engine speed and that the propeller shaft, the speed of which is directly proportional to the speed of the vehicle, operates at a relatively low speed. The plates 43, 44 and 45 operate at a speed that is intermediate those of the fly wheel 1 and the plates 33 and 40 by reason of the difference in gear connections to the countershaft 24. The plates 33 and 40 are directly connected to the propeller shaft through the sleeve 18 and the gears 19, 20 and 21 and these plates therefore operate at a speed corresponding to that of the vehicle.

Since the engine is positively connected to the driving wheels in low gear, the driving torque applied to the latter varies directly with that of the engine and the speeds of the engine and the driving wheels have a definite ratio.

The weights 36, which are provided with tapered recesses, as described above, and are positively connected to the driving wheels, are actuated radially outwardly by centrifugal forces that vary directly with the speed of the vehicle.

At very low vehicle speeds, the force exerted by the weights 36 and which tend to press the plates 33 and 40, and 43, 44 and 45 into engagement with each other and with the sides of the fly wheel are very small and the torque transmitted by the frictionally engaging surfaces of the plates is correspondingly low.

When all of the plates are rotating at different relative speeds, however, the torque that is transmitted by the plates is a multiple of the friction developed by the force exerted by the weights 36. This multiplication of the torque occurs by reason of the number and areas of engaging surfaces that tend to drive the vehicle and thus effect a gear change, as compared with the area of the friction surfaces against which the forces of the centrifugal weights are directly exerted. In the present instance, the areas of friction surfaces which tend to cause a change from first or low gear to second gear are the areas of the frictional surfaces of all of the plates and fly wheel, while the centrifugal forces are directly exerted on the plates 33. The ratio is therefore 4:1.

However, as the vehicle speed increases, the weights 36 exert a correspondingly increased effect and the plates are pressed together with the result that the torque transmitted by the friction plates is correspondingly increased and the parts operating at the higher speeds tend to drive the plates operated at the lower speeds, thereby tending to effect a change in the gear ratio. When the vehicle reaches a speed which may be, for example, from five to fifteen miles per hour, depending upon load requirements, the force exerted by the weights 36 is sufficient to cause the speeds of the plates 33 and 40 to assume that of the plates 43, 44 and 45, and these plates rotate in unison.

The synchronizing of the plates referred to above does not occur suddenly since the gradually increasing force of the centrifugal weights causes the speed of the more slowly moving plates to more closely approach the speed of the faster moving plates. There is therefore a smooth transition from low gear to second gear that is without shock or jar, by reason of the frictional engagement of the parts that effect the change.

When the vehicle is driven by the connections established as described above, the driving force is transmitted from the engine driven fly wheel 1 through the clutch 6, sleeve 13, gears 14 and 25, countershaft 24, clutch 30, gears 26 and 16, sleeve 17, plates 43, 44 and 45, which are synchronous with plates 33 and 40, and through sleeve 18, gears 19, 20 and 21 to the propeller shaft 4.

The vehicle is now driven in second gear through the connections just described and the clutch 31 overruns by reason of the increased speed of the gear 21 which drives the gear 27 at a speed faster than that of the countershaft 24.

The torque tending to change from second gear to high gear is frictional by reason of the relative speeds of the fly wheel 1 and the plates 44 and 45 and this torque is directly proportional to the centrifugal force of the weights 36 since they force the areas of the plates 44 and 45 against equal areas of the fly wheel. There is of course no relative movement between other friction surfaces.

The speed of the vehicle may increase to a rate, for example, between seven and twenty-five miles per hour, depending upon load requirements and the rate at which torque is developed and applied by the engine, whereupon the centrifugal force exerted by the weights 36 will have caused the group of synchronously rotating plates to gradually assume the speed of the fly wheel 1, and when the speeds of all of these members are synchronous, the vehicle will be driven at engine speed or high gear.

The driving connections for high gear extend from the fly wheel 1 through the series of plates 45 and 43, 40 and 33, sleeve 18, and gears 19, 20 and 21 to the propeller shaft 4. This connection provides a direct drive from the engine to the propeller shaft at engine speed and with engine torque. When the transmission mechanism is operating at high speed the clutches 30 and 31 permit the corresponding gears 26 and 27 to overrun the countershaft 24.

If, at any time while the vehicle is operating in high gear, its speed decreases below that at which the weights hold the plates connected for synchronous operation with the fly wheel under the then existing load requirements, the mechanism operates automatically to drop into second gear, by reason of the diminishing centrifugal force of the weights 36 and the driving connections are again those described for operation in second gear. Similarly, a further decrease in the speed of the vehicle under sufficient load requirements results in an automatic change of connections to low gear, as previously described. All of the foregoing changes occur automatically and without noise, shock or jar, by reason of the gradual manner in which they are accomplished by the varying frictional engagement of the plates and the fly wheel.

In the same manner, the gear ratio may change from low to second and from second to high gear without change in speed if the load requirements are sufficiently reduced that the necessary driving torque may be transmitted at the higher speed ratio. It will be obvious also that inceased load requirements may, without change in speed of the vehicle, require such torque that the transmission will automatically drop to a lower speed ratio by reason of the inability of certain of the friction surfaces to transmit such torque without relative movement.

The speeds at which the changes from low gear to second gear and from second to high gear occur may be varied at the desire of the operator by varying the torque applied by the engine by changing the rate at which fuel is supplied to the engine. It will be appreciated that, when the torque transmitted from the engine to the propeller shaft is relatively low, a correspondingly low degree of frictional engagement would be required to effect the synchronous operation of the plates. If, however, the engine exerts a materially higher torque at the same speed, a correspondingly higher degree of frictional engagement would necessarily be required for the change in speed ratio to be accomplished.

It has been found in practice that the change from low gear to second gear may be varied over a range, for example, from five miles per hour to fifteen miles per hour. The change from second gear to high gear may be caused to vary over a range from seven miles per hour to twenty-five miles per hour. This feature is of material importance since if it is desired to accelerate the vehicle at a relatively high rate, it is necessary to apply substantially the maximum torque of the engine and at a low gear ratio until a predetermined speed is attained when it is desirable to shift to the next higher gear ratio.

To obtain maximum rate of acceleration in the operation of my invention it is only necessary to supply maximum fuel to the engine and the change in gear ratios will be delayed until the maximum critical speed is reached for the change to the next higher speed ratio.

It has been found to be possible also to shift from low gear directly to high gear by releasing the clutch 6 and diminishing the supply of fuel to approximately synchronize the engine and the vehicle speeds.

It has been found in practice that it is possible to operate a vehicle at a constant speed of approximately 8 or 9 miles per hour in either low, second or high gear depending upon whether the load was respectively heavy, intermediate or light at that speed.

It may be desired to operate in low gear continuously for a considerable period, as in case the car is in mud or other conditions render driving difficult. It is only necessary to shift the gear 21 to the right to move the gear 20 out of mesh with the gear 19. The sleeve 18 does not rotate and the plates 33 and 40 and the weights 36 are also stationary, thereby entirely eliminating the automatic feature of the transmission mechanism.

To operate the transmission mechanism in reverse, the gear 21 is shifted to the extreme right out of mesh with the gear 27 and into mesh with the idler gear 29. The countershaft 24 is then connected to the propeller shaft 4 through the gears 28, 29 and 21 for rotation of the shaft 4 in the reverse direction.

The transmission mechanism is provided with an improved system of forced lubrication in which certain of the gears are utilized as gear pumps to force oil to bearing surfaces to which access might otherwise be uncertain although the entire mechanism operates in oil. The gears 26 and 28 are provided with shrouds 61 which close the ends of certain of the tooth spaces. Certain of the teeth of the gear 16 are provided with holes 62 through which oil is forced when these teeth enter the closed tooth spaces.

Oil is transmitted through the gear 16 and sleeve 17 to annular grooves 63 in the sleeve 18. A spiral groove 64 connects one of the grooves 63 to an annular groove 65. Similarly, oil is forced through a hole 66 in the gear 28 to a longitudinal duct 67 in the shaft 24. The duct 67 is connected by radial branches to the several bearing surfaces cooperating with the shaft 24. The gear 14 is also provided with a hole 68 for transmitting oil to an annular groove 69 between the sleeves 13 and 17 and to a spiral groove 70.

A gear pump brake 72 that is provided in conjunction with the transmission mechanism of my invention is particularly adapted to cooperate therewith. The details of the brake are shown in Figs. 7 to 10. Two gears 73 and 74 which constitute the moving parts of the brake are respectively mounted on the shafts 4 and 24. The gear 73 is connected to the shaft 4 for rotation therewith, while the gear 74 is loosely mounted on the shaft 24.

Figure 7:
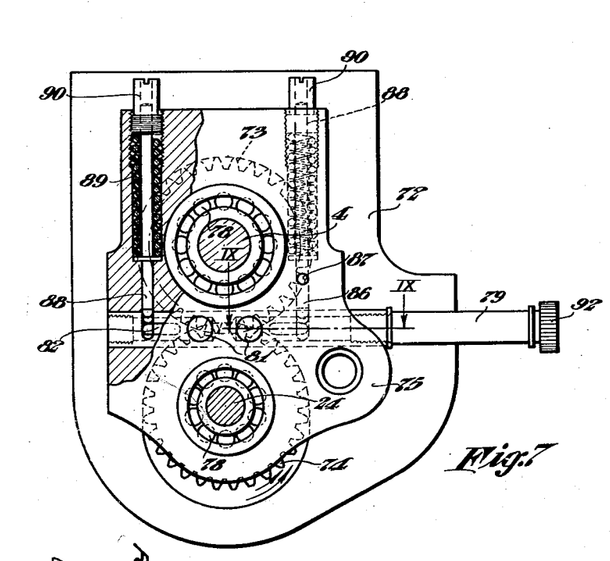
Fig. 7 is a view, partially in side elevation and partially in section on line VII—VII of Fig. 1, of the gear pump brake.

The gears 73 and 74 are enclosed by a casing comprising two side plates 75 and 76, the latter constituting an end wall for the transmission housing 77. The casing for the brake is open at the bottom whereby the gear 74 extends into the oil that is thereby supplied to the brake. Ball bearings 78 for the shafts 4 and 24 are carried by the plates 75 and 76.

The operation of the gear pump brake 72 is controlled by means of a tubular valve 79 which extends through the side plate 75 and controls the communication between the brake mechanism and the interior of the transmission housing which is partially filled with lubricating oil, in accordance with usual practice. The side plate 75 is provided with two openings 81 which communicate directly with the interior of the transmission housing above the level of the oil therein. The plate 75 is also provided with two interior openings 82 which communicate with the spaces at the sides of the intermeshing teeth of the gears 73 and 74.

Figure 9:
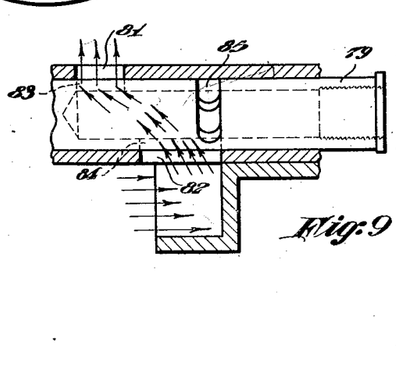
Fig. 9 is an enlarged sectional view of a portion of the valve mechanism for controlling the operation of the brake taken on line IX—IX of Fig. 7.

The tubular valve 79 has two hollow portions each of which has an opening 83 that is adapted to register with one of the openings 81, and has also an opening 84 that is adapted to register with one of the openings 82. Each hollow portion of the valve 79 is provided with an elongated opening or port 85 that communicates with a pressure relief device comprising a vertical duct 86 adapted to communicate with a port 85 and which has an opening 87 communicating with the space in the transmission housing. The opening 87 is normally covered by a piston 88 that is yieldingly held in its lowermost position by a coil spring 89. The force of the spring 89 may be varied by an adjustable plug 90.

Figure 8:
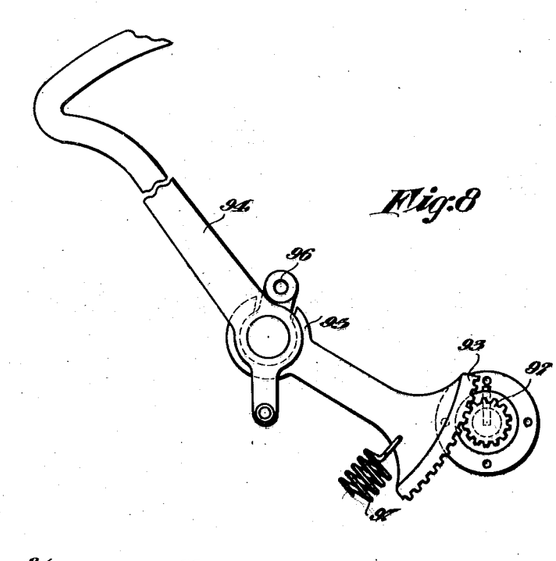
Fig. 8 is a view in side elevation of the brake pedal and certain of the associated controlling mechanism for the brake mechanism of Fig. 7.

The outer end of the stem of the valve 79 is provided with a pinion 92 that meshes with a segmental gear 93, the latter being controlled by the usual clutch pedal 94, a portion of which is shown in Fig. 8. The hub 95 of the segmental gear 93 has a radial slot therein to be engaged by a projection 96 on the clutch pedal, whereby there is a lost motion connection between the clutch pedal 94 and the segmental gear 93 that is sufficient to permit the operation of the clutch pedal in the usual manner without affecting the position of the segmental gear and the valve 79 connected thereto. The segmental gear is normally retained in the position illustrated in Fig. 8 by means of a spring 97.

In the operation of the gear pump brake 72 the normal position of the valve 79 is shown in Fig. 9 in which oil is permitted to flow freely from the side of the gear pump that tends to be under pressure through the corresponding side of the valve 79 and out to the transmission through the openings 83 and 81. Oil is supplied to the brake through the opening at the bottom of the casing to the gear 74 which carries it upward into the brake casing adjacent the intermeshing gear teeth.

For example, as viewed in Fig. 7, if the direction of rotation of the gear 74 is counter clockwise, as indicated by the arrows, oil is carried upward from the transmission housing by the spaces between the teeth of the gear 74 to the space between the gears on the right. Oil then flows outwardly to the crank case, as shown in Fig. 9, through openings. Under the foregoing conditions the oil flows sufficiently freely to cause substantially no braking effect.

In case, however, it is desired to cause the brake 72 to exert a braking effect on the propeller shaft 4, the clutch pedal 94 is depressed to first disengage the clutch 6 and thereafter to cause the projection 96 to engage the hub 95 of the segmental gear 93 and to rotate the pinion 92 to cause the outlet opening 83 to rotate with respect to the opening 81 and thereby retard the flow of oil from the brake casing. The restriction of the flow of oil causes a corresponding resistance to the rotation of the gear wheels 73 and 74 and the braking effect varies with the extent to which the opening 81 is closed by the valve 79. The port 85 is of such length as to communicate with the relief device in all positions of the valve 79.

Figure 10:
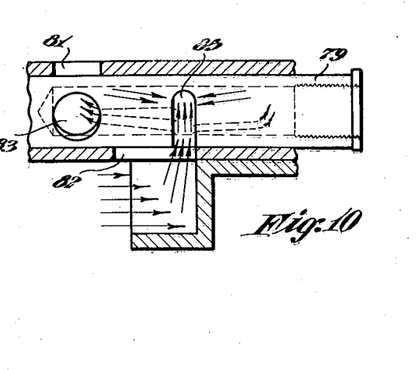
Fig. 10 is a view similar to Fig. 9, the parts of the mechanism being in different relative positions.

In case the valve 79 should be rotated to the position shown in Fig. 10 in which the opening 81 is entirely closed by the valve, oil from the pressure side of the brake flows through the port 85 into the duct 86 and places the piston 88 under pressure. When the pressure exceeds the amount for which the spring 89 is adjusted, the piston is forced to uncover the opening 87 and oil escapes through the latter into the crank case.

The pressure relief devices serve a useful purpose also in that they act as a cushion or buffer in case the valve is closed suddenly and the brake tends to cause an abrupt rise in pressure on the outlet side. Under such conditions the casing of the brake might be ruptured by the sudden rise in pressure, and the danger of this occurrence is removed by the presence of the pressure relief devices.

It will be obvious that the brake 72 may operate equally well in either direction of operation of the vehicle since the sole effect of the reversal of direction of the propeller shaft 4 is to reverse the directions of rotation of the gears 73 and 74 and thus change the pressure side of the brake. The duplication and symmetrical arrangement of the valve and brake parts enable the brake to operate in a substantially identical manner, regardless of the direction of operation of the vehicle. It will be understood that only the portion of the valve on the pressure side of the brake is effective in either direction of rotation.

By reason of the provision of the tubular valve 79, the force required to control the brake 72 is entirely independent of the pressure of the oil therein since the valve does not operate against the oil pressure. Such arrangement permits the easy and gradual application of the brake.

The advantages of a brake constructed and arranged in the manner previously described will be apparent to those skilled in the art relating to the operation of motor vehicles. The braking effect may be varied as desired by the operator merely by the position of the clutch pedal and without force other than that necessary to overcome the springs normally tending to hold the various parts in their inoperative positions. In other words, the operation of the brake is not dependent upon the physical strength of the driver of the vehicle, as in the case of the usual mechanical brake.

The brake mechanism controlled as described above is especially adapted for stopping, holding and starting a vehicle on a steep hill or slope since the release of the clutch and the application of the brake, or vice versa, occur successively and in proper sequence by reason of their control by a single device. Furthermore, the other foot of the driver is free to operate the accelerator in starting under such conditions.

The employment of the brake removes the necessity for operating against the compression of the engine in descending grades or hills. Such operation is unpleasant by reason of the noise and jerkiness occurring when the usual transmission is in low or second gear.

While I have shown and described the brake as operated by the clutch pedal, it may be operated by a foot pedal similar to an accelerator pedal or it may be operated by any suitable hand or foot operated device.

It will be noted that I have provided an improved transmission mechanism that operates entirely automatically to change the speed ratios between the driving and the driven parts of motor vehicles. Such changes occur silently and without shock or impact, since they are effected by a variation in the frictional engagement of relatively movable parts.

The operation of the mechanism is controlled in accordance with certain variable factors such as the grade traversed, the torque applied by the engine and the speed of the vehicle, rather than by the speed of the engine, as has been proposed heretofore, but which has proven impractical in operation. The changes in the speed ratio occur accordingly in accordance with the necessity for the transmission of greater or less torque to the driving wheels, as the case may be. In other words, the transmission operates in accordance with load requirements.

The transmission mechanism of my invention possesses the desirable feature of a direct mechanical connection in low gear which is a great advantage in that it insures that there can be no slippage of the friction elements when the load on the engine is relatively heavy. The automatic operation of the transmission mechanism may be eliminated when desired, as in case of emergency, whereby the transmission mechanism will operate indefinitely at low gear until the proper adjustment has been made.

The transmission mechanism comprises uni-directional clutches that are extremely efficient in operation to drive the gears for operating the vehicle, but which are entirely silent when they are inoperative by reason of the fact that they are forcibly held in their retracted positions out of engagement with relatively movable parts.

I have provided further a gear pump brake that is cooperatively associated with the transmission mechanism for exerting a braking effect on the propeller shaft of the vehicle or other suitable shaft. The gear pump brake may be controlled by the usual clutch pedal in such manner that the ordinary operation of the engine clutch occurs without operation of the brake. The actuation of the brake pedal beyond its usual position however operates the brake to any desired degree. The oil that is supplied to the transmission mechanism constitutes the source of supply for the brake. The brake being symmetrical with respect to its parts for permitting and controlling the flow of oil therethrough is equally effective in both directions of operation.

The foregoing and other advantages will be apparent to those skilled in the art to which my invention relates. Various modifications of the several features of my invention may be proposed, and my invention is not to be limited to the preferred embodiment shown and described except as expressed in the claims.

I claim as my invention:

1. In a transmission mechanism, a driving member, a driven member and means for operatively connecting said members at different speed ratios comprising a plurality of frictionally-engaging elements connected for operation at different speeds and means operable in accordance with the speed of said driven member for controlling the degree of frictional engagement of said elements to progressively and cumulatively control their driving engagement.

2. In a transmission mechanism, a driving member, a driven member and means for operatively connecting said members at different speed ratios comprising a plurality of frictionally-engaging elements connected for operation at different speeds and centrifugal means connected to said driven member for exerting a variable pressure on said elements to control the degree of their frictional engagement to thereby effect their progressive and cumulative driving engagement.

3. In a transmission mechanism, a driving member, a driven member and means for operatively connecting said members at different speed ratios comprising a plurality of elements in frictional engagement, gears and uni-directional devices for connecting said elements for operation at different speeds relative to each other, and centrifugal means connected to said driven member for exerting a variable pressure on said elements to vary their relative speeds.

4. In a transmission mechanism, a driving member, a driven member and means for operatively connecting said members at different speed ratios comprising a plurality of frictionally-engaging elements connected for operation at different speeds and means operable in accordance with the speed of said driven member and the torque exerted by the said driving member to cause the progressive and cumulative engagement or disengagement of said elements to determine the speed ratio between said members.

5. In a transmission mechanism, a driving member, a driven member and means for operatively connecting said members at different speed ratios comprising a plurality of frictionally engaging elements connected to said driven member for operation at different speeds and centrifugal means connected to said driven member for exerting a variable pressure on said elements to control the degree of their frictional engagement and the number of elements in driving engagements and for varying the relative speeds of said elements in accordance with such frictional engagement and the torque exerted by said driving member.

6. In a transmission mechanism, a driving member, a driven member, a friction element connected to said driving member, a second friction element connected to said driven member, a third friction element for yieldingly connecting the first and the second friction elements and having an operative connection to said first element for operation at a lower relative speed, and centrifugal means operative to control the engagement of said elements in accordance with the speed of said driven member.

7. In a transmission mechanism, a driving member, a driven member, means for providing a positive low-gear driving connection between said members, a plurality of friction elements for providing a yielding driving connection between said members for operation in second gear and in high gear, and means controlled in accordance with the speed of the driven member for controlling said friction elements to effect their driving engagement in varying numbers.

8. In a transmission mechanism, a driving member, a driven member, means for providing a positive low-gear driving connection between said members, in a plurality of friction elements for providing a yielding driving connection between said members for operation in second gear and in high gear, and means controlled in accordance with the speed of the driven member for controlling said friction elements to effect their driving engagement in numbers varying with the speed, the speeds of said driving member at which said friction elements effect changes in speed ratios being variable within limits by variations in torque exerted by said driving member.

9. In a transmission mechanism, a driving member, a driven member, a countershaft operatively connected to said driving member and having a low-gear connection to said driven member, a plurality of friction elements in engagement in series, an outer element thereof being connected to said driving member, a second outer element adapted to be connected to said driven member and intermediate element adapted to be driven from said countershaft and centrifugal means connected to said driven member and operable in accordance with the speed of said driven member to control the frictional engagement of said elements and thereby to tend to cause the second friction element and the driven member to operate at the speed of the intermediate element or at the speed of the first-named element.

10. In a transmission mechanism, an engine-driven fly wheel, a main shaft for rotatably supporting said wheel, a clutch for engaging said fly wheel, a series of friction elements within said fly wheel adapted for movement relative to each other and to said fly wheel, centrifugal weights within said fly wheel for controlling the engagement of said friction elements, and a mechanism comprising a countershaft adapted to be driven by means comprising said fly wheel and said clutch and to drive said main shaft and having gear connections to said friction elements at different ratios and comprising also unidirectional devices whereby certain of said gears may over-travel when said centrifugal weights cause said elements to engage each other or said fly wheel to such degree as to rotate synchronously.

11. In a transmission mechanism, a driving member, a driven member, a countershaft adapted to be driven by said driving member and having a low-gear connection to said driven member, a series of engaging friction elements, one being connected to said driving member, another being connected to the driven member and an intermediate element adapted to be driven from said countershaft at a speed intermediate those of the other elements when the driven member is driven by the low-gear connection, and centrifugal means connected to said driven member for controlling the frictional engagement of said elements, said centrifugal means being ineffective to vary the relative speeds of said elements when the load requirements of the driven member exceed a predetermined value for its operating speed, said centrifugal means being operable at successively higher predetermined speeds of said driven member for given load requirements to cause the friction element connected thereto to rotate with the intermediate element and then with the friction element connected to the driving member.

12. In a transmission mechanism, a driving member, a driven member, a countershaft adapted to be driven by said driving member and having a low-gear connection to said driven member, a series of engaging friction elements comprising a low-gear element connected to the driving member, a second gear element adapted to be driven by said countershaft and a high-gear element connected to the driven member, said elements operating at progressively lower speeds in the order named when the driven member is driven through the low-gear connection of said elements and operable when the driven member attains a predetermined speed for given load requirements to cause the high-gear element to rotate with the second gear element whereby the driving and the driven members are connected in second gear, and when the driven member attains a second and higher predetermined speed for similar load requirements to cause all of said elements to rotate at the speed of said driving member whereby said members are directly connected or in high gear, and means for permitting the countershaft to overrun certain of its connections.

13. A transmission mechanism comprising a power-driven member, a shaft and means for operatively connecting said member to said shaft comprising a plurality of gears for connecting them at different speed ratios including low gear, centrifugal means for determining the effective speed ratio, and operatively connected to one of the low-speed gears and manually operable means selectively connecting or disconnecting the low-speed gear and said centrifugal means to correspondingly render the latter operative or inoperative to vary the speed-ratio from low-gear.

14. In a transmission mechanism, a driving member, a driven member, means for operatively connecting said members for operation at different speed ratios comprising low gear, second gear and high gear, said means comprising a plurality of friction clutch elements connected for operation at second gear and high gear, and means automatically operable in accordance with the speed of said driven member for controlling the degree of frictional engagement of said elements and the number of said elements in engagement and thereby determining the speed ratio between said members.

15. In a transmission mechanism, a driving member, a driven member, means for operatively connecting said members for operation at different speed ratios comprising low gear, second gear and high gear, said means comprising a plurality of friction clutch elements connected for operation at second gear and high gear, and centrifugal means connected to said driven member for exerting a variable pressure on said elements to control the degree of their frictional engagement and the number of elements in engagement.

16. In a transmission mechanism, a driving member, a driven member, means for operatively connecting said members for operation at different speed ratios comprising low gear, second gear and high gear, said means comprising three friction clutch elements connected for operation at second gear and high gear, and means operable in accordance with the speed of said driven member and the torque exerted by said driving member to cause the engagement of two or three of said elements to determine the speed ratio between said members.

17. In a transmission mechanism, a driving member, a driven member, means for operatively connecting said members for operation at different speed ratios comprising low gear, second gear and high gear, said means comprising three friction clutch elements connected for operation at second gear and high gear, and centrifugal means connected to said driven member for exerting a variable pressure on said elements to control the number of said elements in engagement the degree of their frictional engagement and for varying the relative speeds of said elements in accordance with such frictional engagement and the torque exerted by said driving member.

In testimony whereof, I have hereunto subscribed my name this 6th day of May, 1929.

FERDINAND M. BARTELME.